United States Patent [19]
Akiyama et al.

[11] Patent Number: 5,872,994
[45] Date of Patent: Feb. 16, 1999

[54] FLASH MEMORY INCORPORATING MICROCOMPUTER HAVING ON-BOARD WRITING FUNCTION

[75] Inventors: Shin-Ichiro Akiyama; Sadahiro Yasuda; Yuichi Iizuka, all of Tokyo; Hiroaki Nishimoto; Yuuichi Osada, both of Kawasaki, all of Japan

[73] Assignee: NEC Corporation, Tokyo, Japan

[21] Appl. No.: 745,828

[22] Filed: Nov. 12, 1996

[30] Foreign Application Priority Data

Nov. 10, 1995 [JP] Japan ................................ 7-293127

[51] Int. Cl.$^6$ .............................. G06F 9/44; G06F 12/12
[52] U.S. Cl. .................... 395/800.43; 711/165; 711/105; 395/183.05; 365/185.33
[58] Field of Search ................................ 395/200.5, 733, 395/500, 182.01, 182.03, 185.33, 683, 701, 200.14, 712, 843; 379/93.23, 93.08, 93; 365/185.33, 185.09, 185.19; 364/DIG. 1, DIG. 2; 711/113, 115, 102, 165

[56] References Cited

U.S. PATENT DOCUMENTS 4,809,167  2/1989  Pawloski et al. .
5,459,850  10/1995  Clay et al. ........................ 395/497.02
5,535,328  7/1996  Harari et al. ..................... 395/182.05

FOREIGN PATENT DOCUMENTS 0 402 682 A2  5/1990  European Pat. Off. .
5-266219  10/1993  Japan .

*Primary Examiner*—Daniel H. Pan
*Attorney, Agent, or Firm*—Scully, Scott, Murphy and Presser

[57] ABSTRACT

In a microcomputer comprising internal buses, a serial communication interface, a flash memory, a RAM, a ROM for storing a writing program, an input/output port, a CPU, and a mode control unit for setting various operation modes and test modes in the microcomputer, a switching circuit is connected between the ROM and the internal buses and between the input/output port and the internal buses. The mode control unit operates the switching circuit in an emulation test mode so that the ROM is deactivated and the input/output port is activated. Then, the CPU reads a program from the serial communication interface and writes the program into the flash memory in accordance with a writing program from the input/output port.

26 Claims, 17 Drawing Sheets

USUAL OPERATION MODE

ON-BOARD WRITING OPERATION MODE

CPU TESTING MODE

FLASH EEPROM TESTING MODE

EMULATION TEST MODE

FLASH MEMORY INCORPORATING MICROCOMPUTER HAVING ON-BOARD WRITING FUNCTION

BACKGROUND OF THE INVENTION

1. Field of the Invention

The present invention relates to a flash memory incorporating microcomputer, and more partucilarly, to the testing of the microcomputer.

2. Description of the Related Art

Microcomputers have been broadly incorporated into cameras, audio-visual apparatus, automobiles and the like. Generally, a control program for operating a microcomputer is stored in a read-only memory (ROM). However, since the control program needs to be changed as occasion demands, the mask ROM has been replaced by an erasable and programmable ROM (EPROM), an electrically-erasable programmable ROM (EEPROM), or a flash EEPROM which is called a flash memory.

A prior art flash memory incorporating microcomputer includes input/output ports, a serial ccommunication interface, a mode control unit for setting various operation modes, a flash EEROM for storing a control program, a random access memory (RAM) for storing temporary data, a read-only memory (ROM) for storing a writing program for writing the control program into the flash EEPROM, a central processing unit (CPU) and internal buses for connecting these elements to each other (see JP-A-5-266219). This will be explained later in detail.

In the prior art microcomputer, although the CPU is tested in a CPU testing mode and the flash EEPROM is tested in a flash EEPROM testing mode, the flash EEPROM is not tested by the CPU. Therefore, even if the CPU testing mode and the flash EEPROM test mode both succeed, it is impossible to guarantee the operation of the flash EEPROM by the CPU.

Also, the ROM is active only for an on-board writing operation mode; in other words, the ROM is inactive for the other operation modes. Therefore, when the ROM is incorporated into one chip of the microcomputer, the chip area thereof is increased, thus reducing the manufacturing yield.

Further, since the serial communication interface is fixed to one of the types of communication systems, an upper system is limited.

Further, in order to write the control program into the flash EEPROM, since the control program is temporarily stored in the RAM or a buffer of the CPU, the time required for a writing operation of the control program is long.

Still further, when the frequency of a clock signal is changed by an upper system or the type of the serial communication interface, the time period of a writing operation and the time period of a flash erasing operation are also changed.

SUMMARY OF THE INVENTION

It is an object of the present invention to guarantee the operation of a flash memory by a CPU in a microcomputer.

Another object is to reduce the chip area of a flash memory incorporating microcomputer.

A further object is to match a flash memory incorporating microcomputer with various kinds of upper systems.

A still further object is to increase the operation speed of an on-board writing operation mode of a flash memory incorporating microcomputer.

A further object is to make the writing time period and the flash erasing time period of a flash memory almost constant even when the frequency of a clock signal is changed by upper systems or the like.

According to the present invention, in a microcomputer including internal buses, a serial communication interface, a flash memory, a RAM, a ROM for storing a writing program, an input/output port, a CPU, and a mode control unit a switching circuit is connected between the ROM and the internal buses and between the input/output port and the internal buses. The mode control unit operates the switching circuit in an emulation test mode so that the ROM is deactivated and the input/output port is activated. Then, the CPU reads the program from the serial communication interface and writes the program into the flash memory in accordance with a writing program from the input/output port. Thus, the operation of the flash memory by the CPU can be guaranteed.

Also, in the present invention, a writing program for writing a program into the flash memory is incorporated into the RAM. As a result, the ROM for storing the writing program is unnecessary, so that the chip area of the microcomputer can be reduced.

Further, in the present invention, the serial communication interface includes a plurality of kinds of serial communication interface units and a selector for selecting one of the serial communication interface units. Thus, the microcomputer can respond to various kinds of upper systems.

Still further, in the present invention, in an on-board writing operation, the read speed of a program is detected by a data reception time detector. As a result, when the read speed is high, the CPU temporarily stores the program in the RAM or a buffer of the CPU before writing the program into the flash memory. On the other hand, when the read speed is low, the CPU directly writes the program into the flash memory.

Further, in the flash memory according to the present invention, a value of a register for defining a writing operation time period or a flash erasing operation time period is variable.

BRIEF DESCRIPTION OF THE DRAWINGS

The present invention will be more clearly undersood from the description as set forth below, as compared with the prior art, with reference to the accompanying drawings, wherein.

DESCRIPTION OF THE PREFERRED EMBODIMENT

Before the description of the preferred embodiments, a prior art flash memory incorporating microcomputer will be explained with reference to FIGS. 1 2A through 2D, 3 and 4 (see: JP-A-5-266219).

Figure 1:
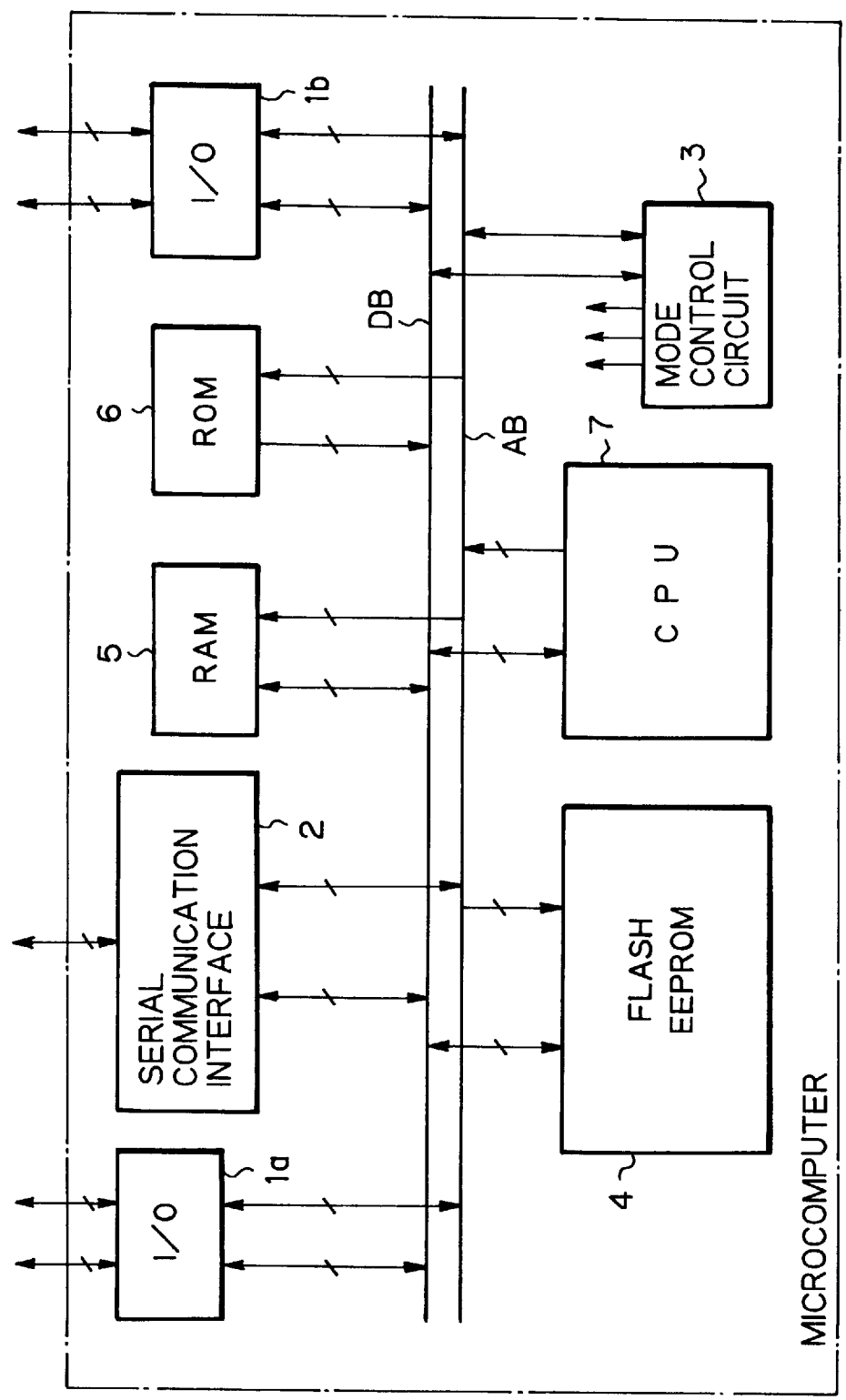
FIG. 1 is a block circuit diagram illustrating a prior art flash memory incorporating microcomputer.

In FIG. 1, provided between internal buses such as an address bus AB, a data bus DB and a control bus (not shown) and external circuits (not shown) are input/output ports 1a and 1b and a serial communication interface 2 for receiving an address signal, a data signal and a control signal and transmitting them.

A mode control unit 3 receives various mode signals from the data bus DB to set various operation modes in each section of the microcomputer of FIG. 1.

A flash EEPROM 4 is connected to the address bus AB, the data bus DB and the control bus. That is, in a write mode, a control program is written from the data bus DB into the flash EEPROM 4 whose address is designated by the address signal at the address bus AB. Also, in a read mode, the control program is read to the data bus DB from the flash EEPROM 4 whose address is designated by the address signal at the address bus AB.

A RAM 5 is connected to the address bus AB, the data bus DB and the control bus. That is, in a write mode, data is written from the data bus DB into the RAM 5 whose address is designated by the address signal at the address bus AB. Also, in a read mode, data is read to the data bus DB from the RAM 5 whose address is designated by the address signal at the address bus AB.

A ROM 6 stores a writing program for writing the control program into the flash EEPROM 4.

A CPU 7 controls the input/output ports 1a and 1b, the serial communication interface 2, the flash EEPROM 4, the RAM 5 and the ROM 6 in accordance with operation modes set by the mode control unit 3.

The operation of the microcomputer of FIG. 1 is explained next with reference to FIGS. 2A, 2B, 2C and 2D, in which only the operated blocks are extracted from FIG. 1.

Figure 2A:
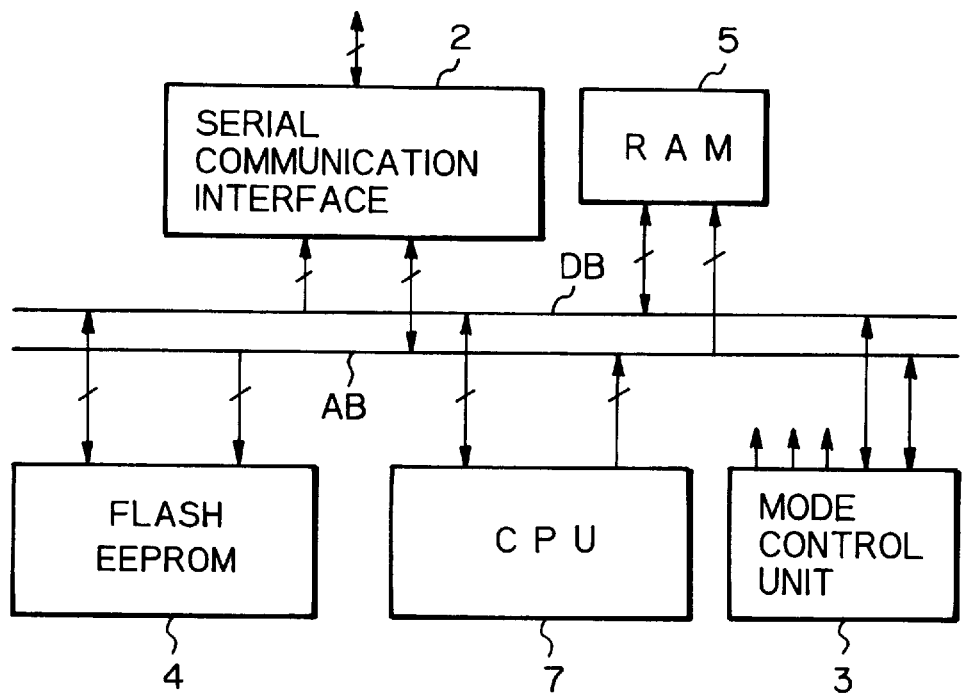
FIGS. 2A, 2B, 2C and 2D are block circuit diagrams for showing the operations of the microcomputer of FIG. 1.

A usual operation is illustrated in FIG. 2A. In this case, the mode control unit 3 recognizes a usual operation mode by the data signal at the data bus DB supplied from the input/output port 1a (not shown in FIG. 2A, but shown in FIG. 1) or the like. As a result, the mode control unit 3 connects the serial communication interface 2, the flash EEPROM 4, the RAM 5 and the CPU 7 to the address bus AB, the data bus DB and the control bus. Note that the input/output port 1a or 1b can be connected to the address bus AB, the data bus DB and the control bus simultaneously with the serial communication interface 2 or instead of the serial communication interface 2.

In the usual operation mode, the CPU 7 reads the control program from the flash EEPROM 4 to control the serial communication interface 2, the flash EEPROM 4 and the RAM 5. For example, the CPU 7 performs a predetermined operation upon signals supplied via the serial communication interface 2 from the external circuit (not shown) and returns resulting signals to the external circuit. Also, the CPU 7 reads data from the RAM 5 to perform a predetermined operation upon the data, and writes resulting data into the RAM 5.

Figure 2B:
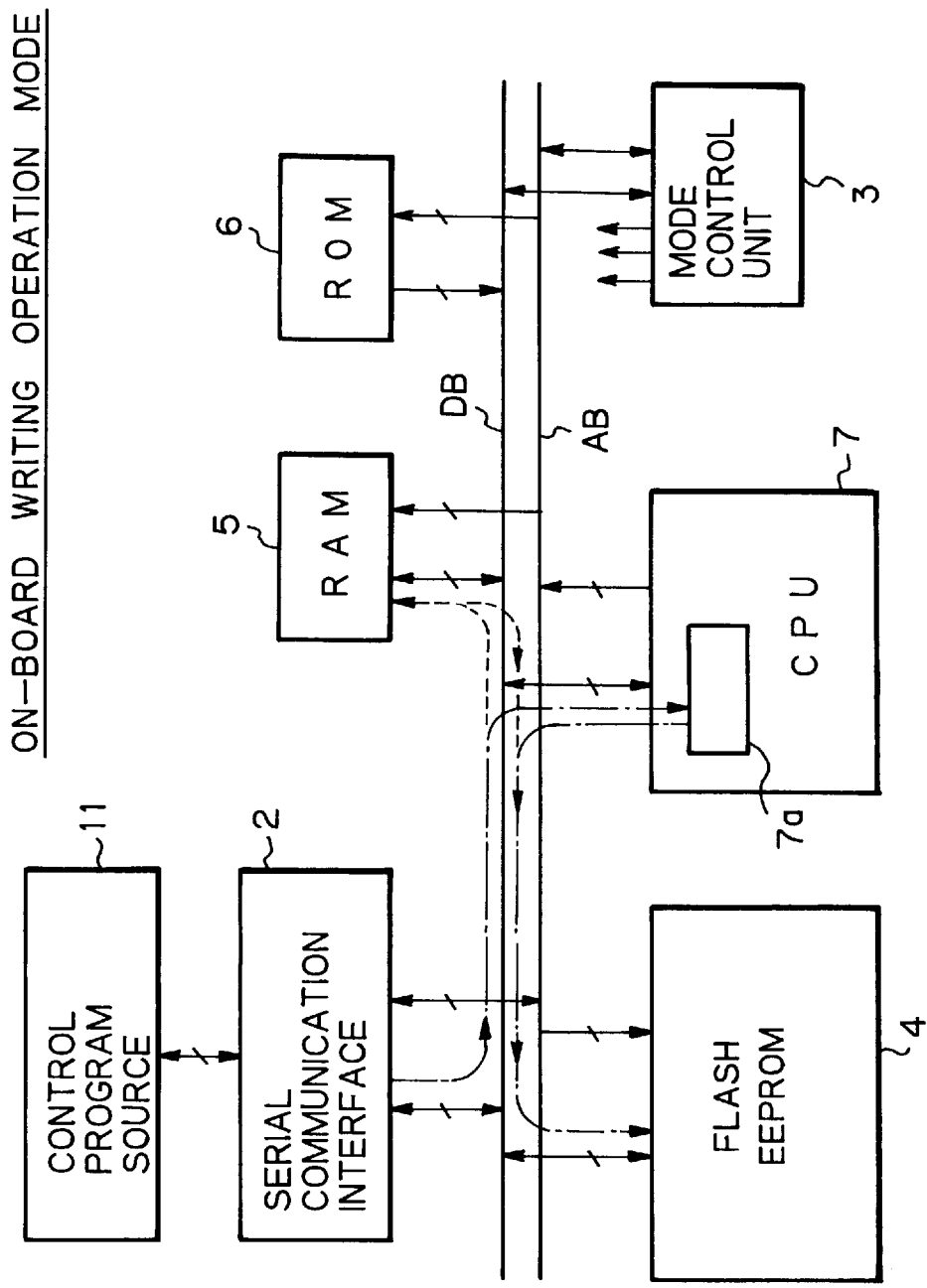

An on-board writing operation mode is illustrated in FIG. 2B. In this case, a control program source 11 is connected via an adapter (not shown) to the serial communication interface; however, such a control program source 11 can be connected to the input/output port 1a or 1b. When, the mode control unit 3 recognizes an on-board writing operation mode by the data signal at the data bus DB supplied from the input/output port 1a (not shown in FIG. 2A, but shown in FIG. 1) or the like, the mode control unit 3 connects the serial communication interface 2, the flash EEPROM 4, the RAM 5 and the CPU 7 to the address bus AB, the data bus DB and the control bus.

In the on-board writing operation mode, the CPU 7 reads the control program via the serial communication interface 2 from the control program source 11 in accordance with the writing program stored in the ROM 6, and temporarily stores the control program into the RAM 5. Then, the control program is written into the flash EEPROM 4 at a predetermined timing. Note that the control program can be temporarily stored in a buffer 7a of the CPU 7 instead of the RAM 5.

Figure 2C:
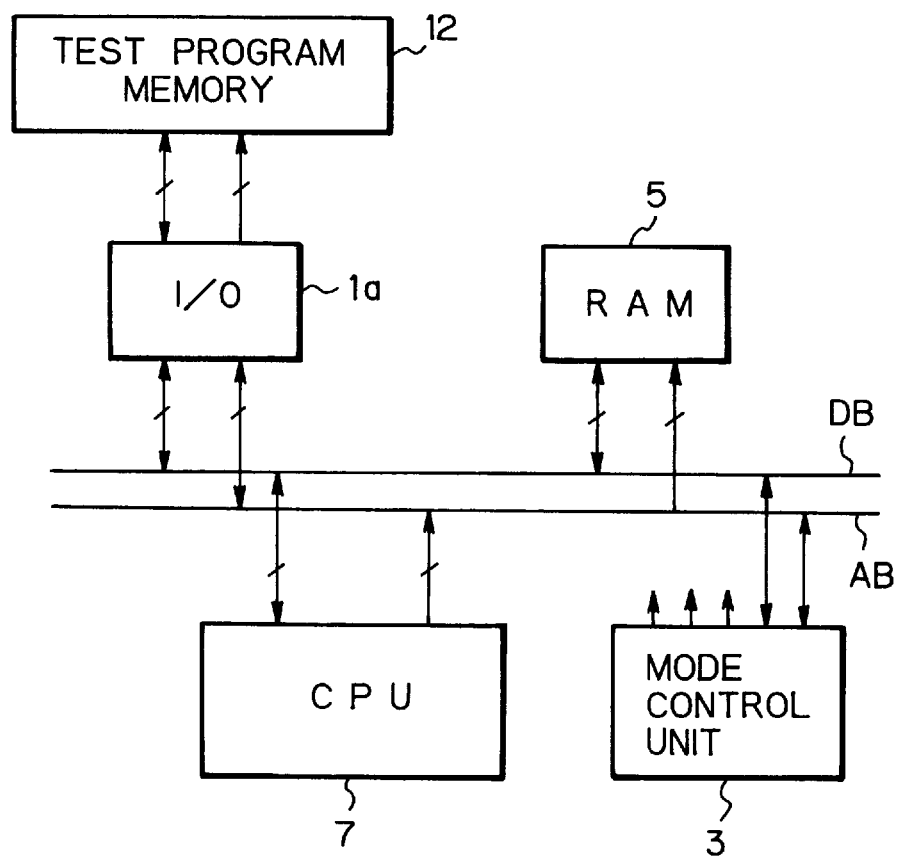

A CPU testing mode is illustrated in FIG. 2C. In this case, a test program memory 12 is connected to the input/output port 1a; however, such a test program memory 12 can be connected to the serial communication interface 12. When the mode control unit 3 recognizes a CPU testing mode by the data signal at the data bus DB supplied from the input/output port 1a, the mode control unit 3 connects the input/output port 1a, the RAM 5 and the CPU 7 to the address bus AB, the data bus DB and the control bus. That is, the flash EEPROM 4 is separated from the internal buses.

In the CPU testing mode, the CPU 7 reads a test program from the test program memory 12, so as to carry out various operations in accordance with the test program. For example, temporary data is stored in the RAM 5, and result data is outputted via the input/output port 1a to the test program memory 12 or via the intput/output port 1b (not shown in FIG. 2C, but shown in FIG. 1).

In FIG. 2C, an LSI tester instead of the test program memory 12 can be connected to the input/output port 1a. Thus, test patterns are generated from the LSI tester, to perform a test upon the microcomputer.

Figure 2D:
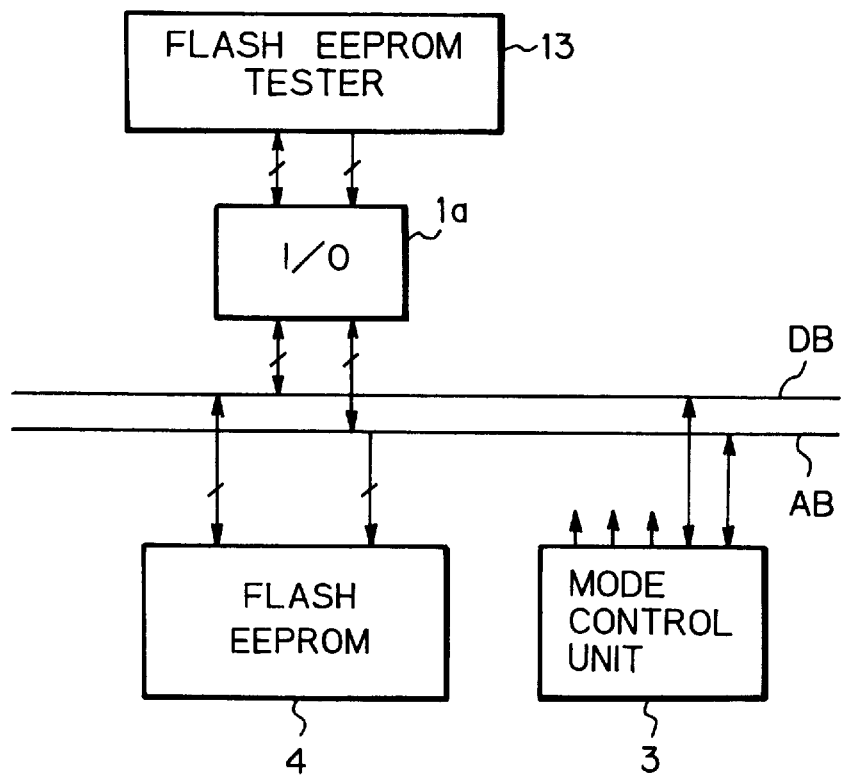

A flash EEPROM testing mode is illustrated in FIG. 2D. In this case, a flash EEPROM 4 is connected to the address bus AB, the data bus DB and the control bus. That is, the CPU 7 is separated from the internal buses. As a result, the flash EEPROM tester 13 performs a writing operation, a writing verification operation, a flash erasing operation and an erasing verification operation upon the flash EEPROM 4. Thus, a testing time for the flash EEPROM 4 by the flash EEPROM tester 13 can be reduced as compared with that by the CPU 7.

There are various types of the serial communication interface 2. One is a clock synchronous three-wire communication interface using three signal lines for a clock signal, a transmitting data signal and a receiving data signal. Another is an asynchronous two-wire communicaiton interface (UART) using two signal lines for a transmitting data signal and a receiving data signal each having a start pulse and a stop pulse. Still another is a synchroonous IIC bus communication interface using two signal lines for a clock signal and a transmitting/receiving data signal. One of the types of serial communication interfaces is adopted in accordance with the scale of the serial communication interface 2, the characteristics such as operating speed, a characteristic of resistance to environment such as noise, the number of signals, the kind of upper system including the microcomputer, the ratio of chip area of the serial communication interface 2 to that of the microcomputer, the matching of the upper system and the like.

Figure 3:
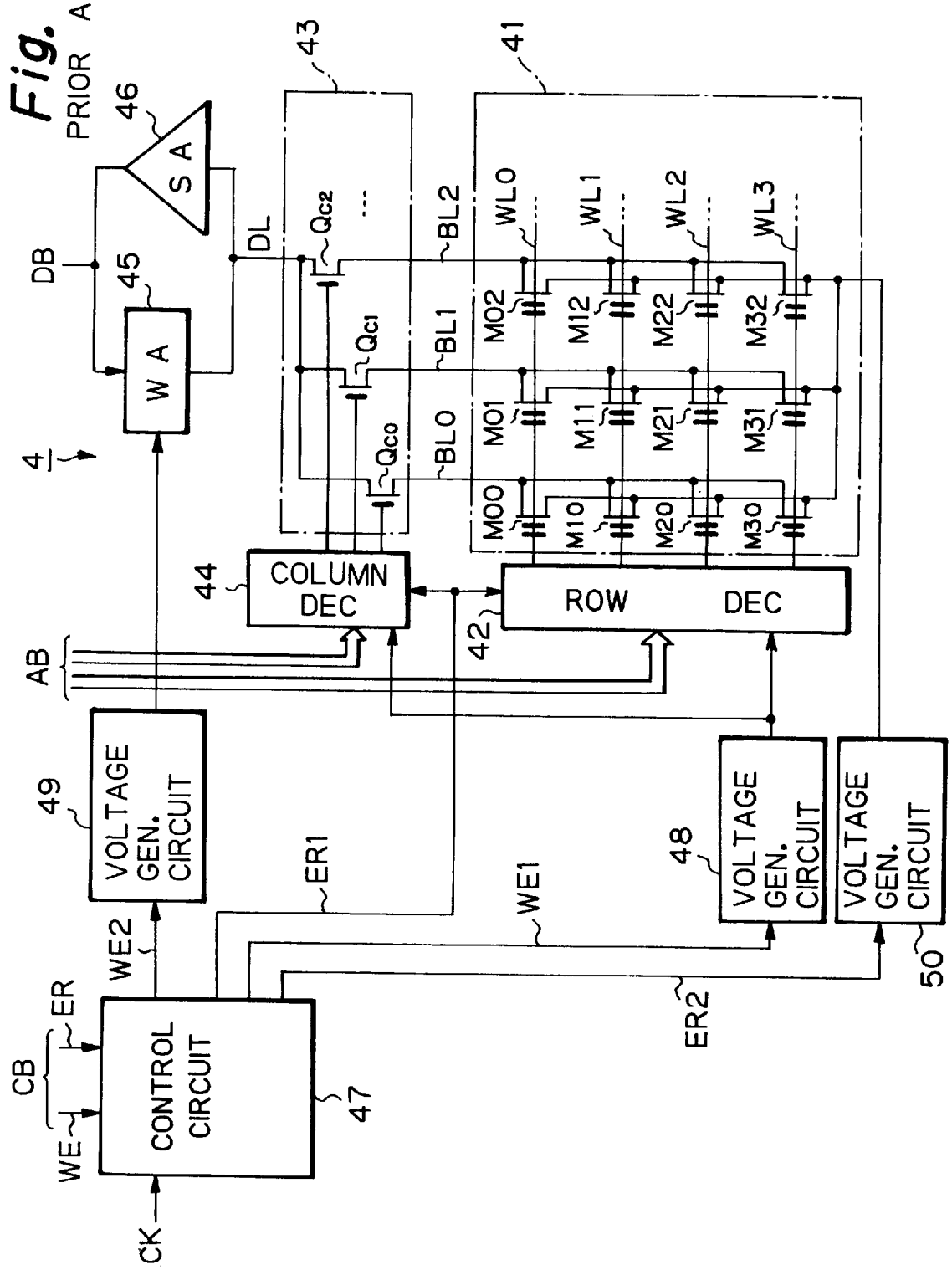
FIG. 3 is a detailed circuit diagram of the flash EEPROM of FIG. 1.

In FIG. 3, which is a detailed circuit diagram of the flash EEPROM of FIG. 1, a plurality of word lines WL0, WL1, . . . and a plurality of bit lines BL0, BL1, . . . are provided. Reference numeral 41 designates a memory cell array formed by memory cells M00, M01, . . . each having a source, a drain connected to one of the bit lines BL0, BL1, . . . a floating gate, and a control gate connected to one of the word lines WL0, WL1, . . . .

A row decoder 42 selects one of the word lines WL0, WL1, . . . . On the other hand, a column selection circuit 43 and a column decoder 44 selects one of the bit lines BL0, BL1, . . . . That is, the column selection circuit 43 is formed by column selection transistors $Q_{C0}$, $Q_{C1}$, . . . each connected between one of the bit lines BL0, BL1, . . . and a digit line DL. One of the column selection transistors $Q_{C0}$, $Q_{C1}$, . . . is selected and turned ON by the column decoder 44. The row decoder 42 and the column decoder 44 receive address signals from the address bus AB.

A write amplifier 45 receives data from the data bus DB and transmits it to the digit line DL. On the other hand, a sense amplifier 46 senses data at the digit line DL and transmits it to the data bus DB.

Voltages applied to the row decoder 42, the column decoder 44, the write amplifier 45 and the sources of the memory cells M00, M01, . . . are controlled by a control circuit 47 as well as voltage generating circuit 48, 49 and 50. In this case, the control circuit 47 receives a write enable signal WE and an erase signal ER from a control bus CB which is not shown in FIG. 1.

In more detail, when the control circuit 47 receives the write enable signal WE, the control circuit 47 generates a control signal WE1 in synchronization with the write enable signal WE and transmits it to the voltage generating circuit 48. As a result, a voltage $V_{PP}$ higher than a power supply voltage $V_{CC}$ is applied to the row decoder 42 and the column decoder 44. Simultaneously, the control circuit 47 generates a control signal WE2 in synchronization with the write enable signal WE and transmits it to the voltage generating circuit 49. As a result, the $V_{PP}$ is applied to the write amplifier 45, so that the write amplifier 45 applies a high voltage to the digit line DL in accordance with the data signal at the data bus DB. In this case, all the sources of the memory cells M00, M01, . . . are grounded by the voltage generating circuit 50. Therefore, in a selected memory cell, high voltages are applied to the drain and the control gate while the source is grounded, thus carrying out a write operation. For example, the threshold voltage of the selected memory cell is made higher.

On the other hand, when the control circuit 47 receives the erase signal ER, the control circuit 47 generates a control signal ER1 in synchronization with the erase signal ER and transmits it to the row decoder 42 and the column decoder 44. As a result, the row decoder 42 deactivates all the word lines WL0, WL1, . . . , so that all the word lines WL0, WL1, . . . are grounded. Also, the column decoder 44 deactivates all the column switching transistors $Q_{C0}$, $Q_{C1}$, . . ., so that all the column switching transistors $Q_{C0}$, $Q_{C1}$, are turned OFF. As a result, all the drains of the memory cells M00, M01, . . . are in a floating state. Simultaneously, the control circuit 47 generates a control signal ER2 in synchronization with the erase signal ER and transmits it to the voltage generating cirucit 50. As a result, the voltage generating circuit 50 applies the high voltage $V_{PP}$ to all of the sources of the memory cells M00, M01, . . . . Thus, a flash erase operation is carried out, so that the threshold voltages of all the memory cells are made lower.

Figure 4:
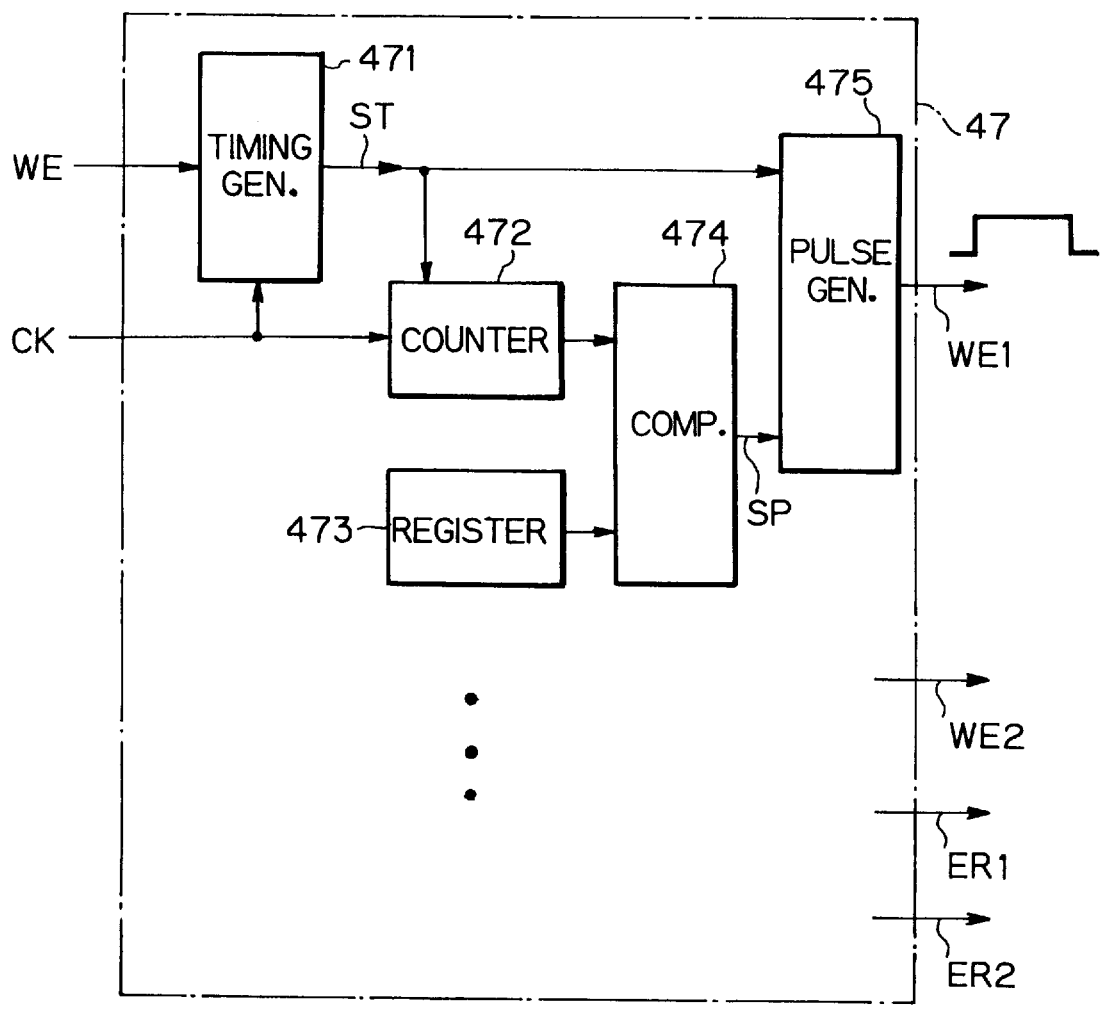
FIG. 4 is a detailed circuit diagram of the control circuit of FIG. 3.

In FIG. 4, which is a detailed circuit diagram of the control circuit 47 of FIG. 3, only a section for generating the control signal WE1 is illustrated; the other sections for generating the control signals WE2, ER1 and ER2 are similar to this section. That is, the control circuit 47 includes a timing generating circuit 471 for receiving the write enable signal WE1 to generate a start pulse ST in synchronization with a clock signal CK. A counter 472 is initiated by receiving the start pulse ST to count the clock signal CK. A comparator 474 compares the content of the counter 472 with a preset value in a register 473. As a result, when the content of the counter 472 coincides with the preset value of the register 473, the comparator 474 generates a stop pulse SP. A pulse generating circuit 475 responds to the start pulse ST and the stop pulse SP. That is, the control signal WE1 rises in response to the start pulse ST and falls in response to the stop pulse SP. Note that the preset value of the register 473 is a definite value depending on the frequency of the clock signal CK. For example, the preset value corresponds to about 50 μs for the control signals WE1 and WE2, and corresponds to about 2 s for the control signals ER1 and ER2.

In the microcomputer of FIG. 1, although the CPU 7 is tested in the CPU testing mode and the flash EEPROM 4 is tested in a flash EEPROM testing mode, the flash EEPROM is not tested by the CPU 4. Therefore, even if the CPU testing mode and the flash EEPROM test mode both succeed, it is impossible to guarantee the operation of the flash EEPROM by the CPU 7, since the write enable signal WE, the erase signal ER and the other timing signals from the CPU 7 to the flash EEPROM 4 are not tested.

Note that the test of the writing operation, the writing verification operation, the flash erasing operation and the erasing verification operation of the flash EEPROM 4 under the CPU 7 may be possible by operation of the ROM 6. In this case, however, since the ROM 6 includes a redundant program, it is impossible to effectively carry out such a test.

Also, the ROM 5 is active only for an on-board writing operation mode; in other words, the ROM 6 is inactive for the other operation modes. Therefore, when the ROM 6 is incorporated into one chip of the microcomputer, the chip area thereof is increased, thus reducing the manufacturing yield.

Further, since the serial communication interface 2 is fixed to one of the types of communication systems, an upper system is limited. If the microcomputer is forced to respond to all types of communication systems, a plurality of such types of serial communication interfaces have to be introduced into the chip of the microcomputer, thus making the control complex. Also, this increases the chip area, which reduces the manufacturing yield.

Further, in order to write the control program into the flash EEPROM, since the control program is temporarily stored in the RAM 5 or a buffer 7a of the CPU 7, the time of a writing operation of the control program is long.

Still further, in the control circuit 47 of the flash EEPROM 4, the time period of a writing operation and the time period of a flash erasing operation are determined by the preset value of the register 472 and the like. In this case, however, when the frequency of the clock signal CK is changed by the upper system or the type of the serial communication interface 2, the time period of a writing operation and the time period of a flash erasing operation are also changed.

Figure 5:
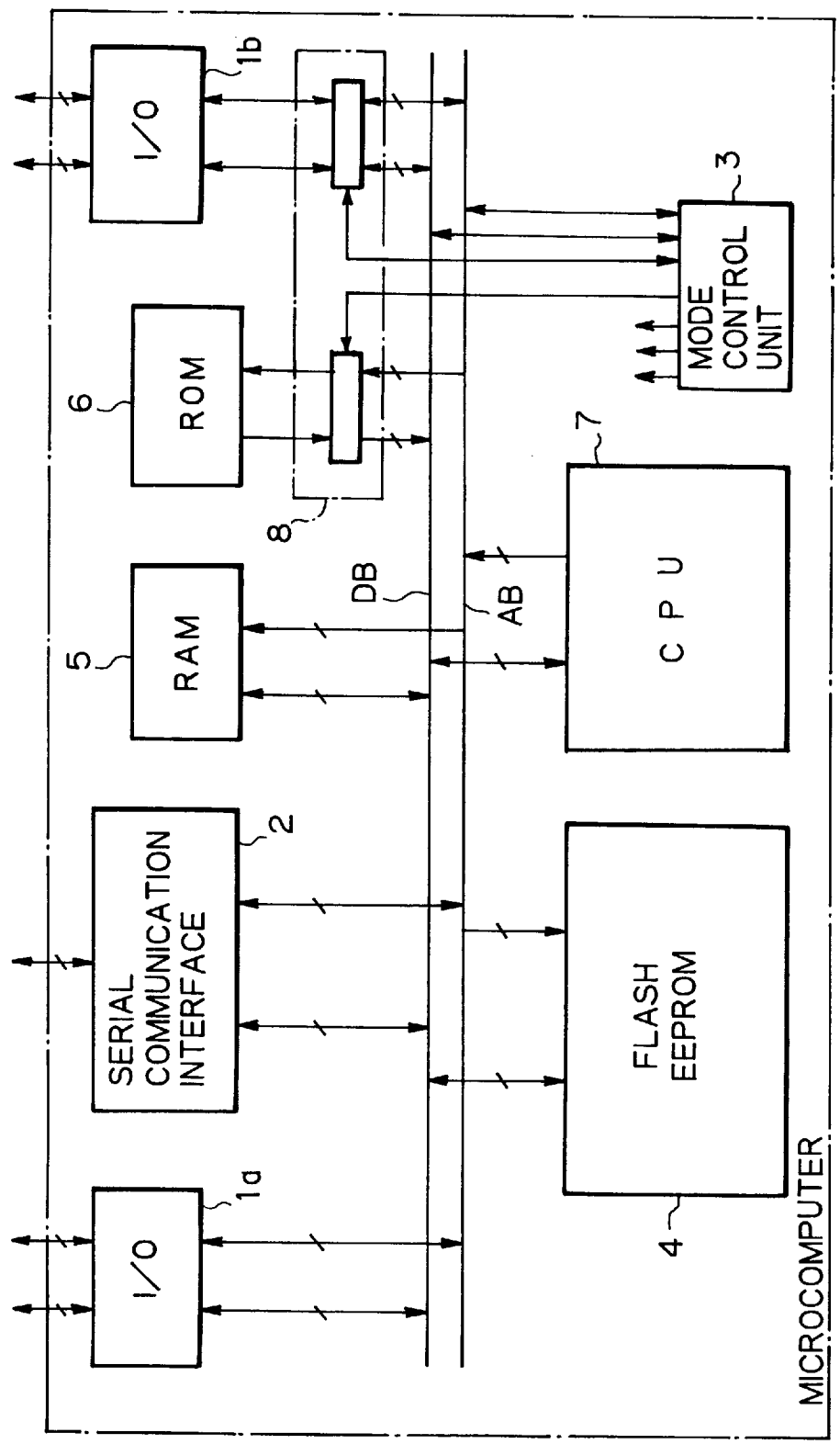
FIG. 5 is a block circuit diagram illustrating a first embodiment of the flash memory incorporating microcomputer according to the present invention.

In FIG. 5, which illustrates a first embodiment of the microcomputer according to the present invention, a switching circuit 8 is interposed between the input/output port 1b and the internal buses and between the ROM 6 and the internal buses. In the case, the ROM 6 has the same address space as an external circuit connected to the input/output port 1b. Also, the switching circuit 8 is controlled by the mode control circuit 3. That is, in an emulation test mode, the switching circuit 8 is operated so that the ROM 6 is deactivated and the input/output port 1b is activated. The operations of the microcomputer of FIG. 5 are the same as those of the microcomputer of FIG. 1 except for an emulation test operation.

Figure 6:
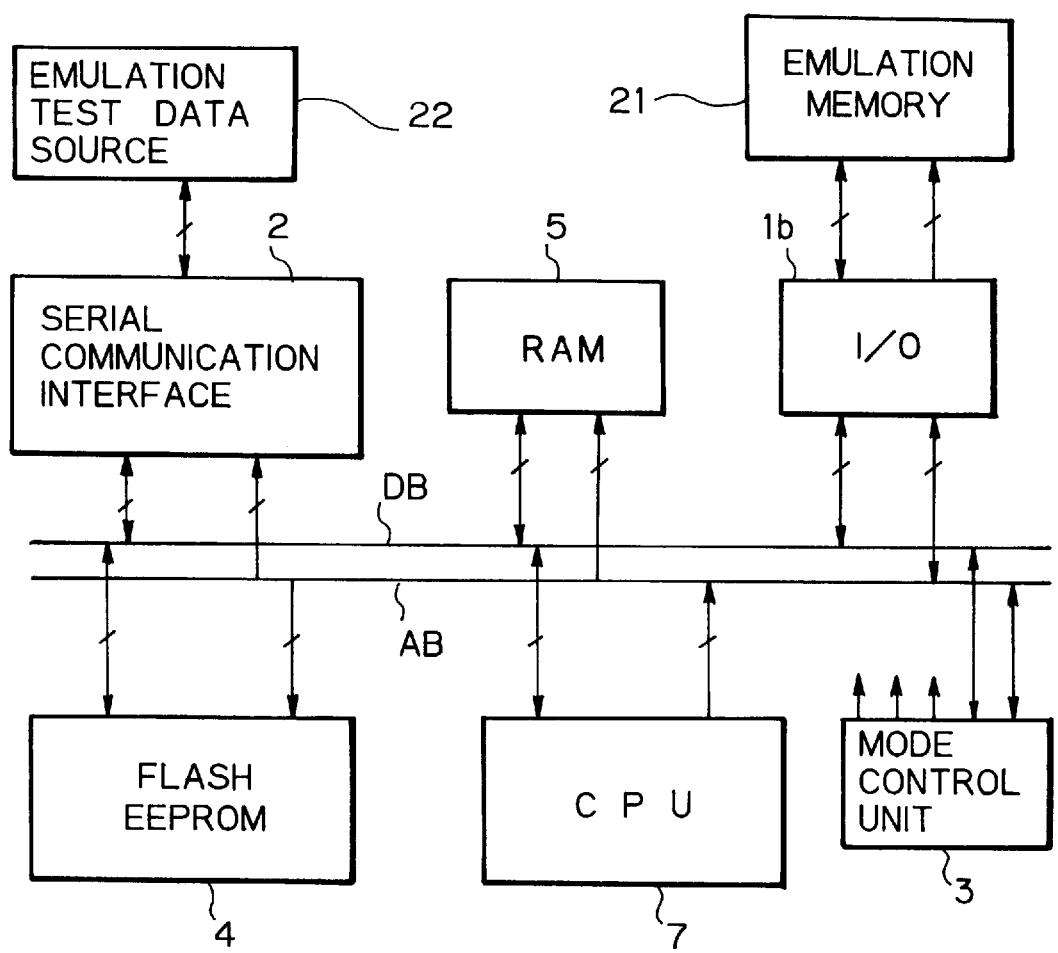
FIG. 6 is a block circuit diagram for showing the operation of the microcomputer of FIG. 5.

The emulation test mode is illustrated in FIG. 6 where the deactivated blocks are removed from FIG. 5. That is, in advance of the emulation test operation, an emulation memory 21 is connected to the input/output port 1b, and an emulation test data source 22 is connected to the serial communication interface 2. First, the mode control unit 3 recognizes an emulation test mode by the data signal at the data bus DB supplied from the input/output port 1a (not shown in FIG. 6, but shown in FIG. 5) or the like. As a result, the mode control unit 3 connects the serial communication interface 2, the flash EEPROM 4, the RAM 5 and the CPU 7 to the address bus AB, the data bus DB and the control bus. Also, the mode control unit 3 operates the switching circuit 8 so that the ROM 6 is deactivated and the input/output port 1b, i.e., the emulation memory 21 is activated. Therefore, the emulation memory 21 can be accessed by the same addresses for the ROM 6. Thus, the CPU 7 reads an emulation test data via the serial communication interface 2 from the emulation test data source 22 in accordance with the emulation program stored in the emulation memory 21, and temporarily stores the emulation test data into the RAM 5. Then, the emulation test data is written into the flash EEPROM 4 at a predetermined timing. Note that the emulation test data program can be temporarily stored in the buffer of the CPU 7 instead of the RAM 5.

Thus, the functions of the serial communication interface 2, the RAM 5 and the CPU 7 are tested.

Also, when the emulation test data is written into the flash EEPROM 4, a writing verification operation is carried out by the CPU 7 in accordance with the emulation program stored in the emulation memory 21. Thus, a determination of whether or not an on-board writing operation is normally carried out can be done. As a result, if the on-board writing operation is determined to be abnormal, the emulation program stored in the emulation memory 21 and the emulation memory 21 and the emulation test data stored in the emulation test data source 22 are corrected, thus carrying out an on-board writing operation again.

Further, a writing program, a writing verification program, a flash erasing program and an erasing verification program are stored in the emulation memory 21. Therefore, the CPU 7 performs a writing operation, a writing verification operation, a flash earsing operation and an erasing verification operation upon the flash EEPROM 4 in accordance with the emulation program stored in the emulation memory 21.

Thus, the write enable signal, the erase signal and the other timing signals from the CPU 7 to the flash EEPROM 4 can be effectively tested.

Figure 7:
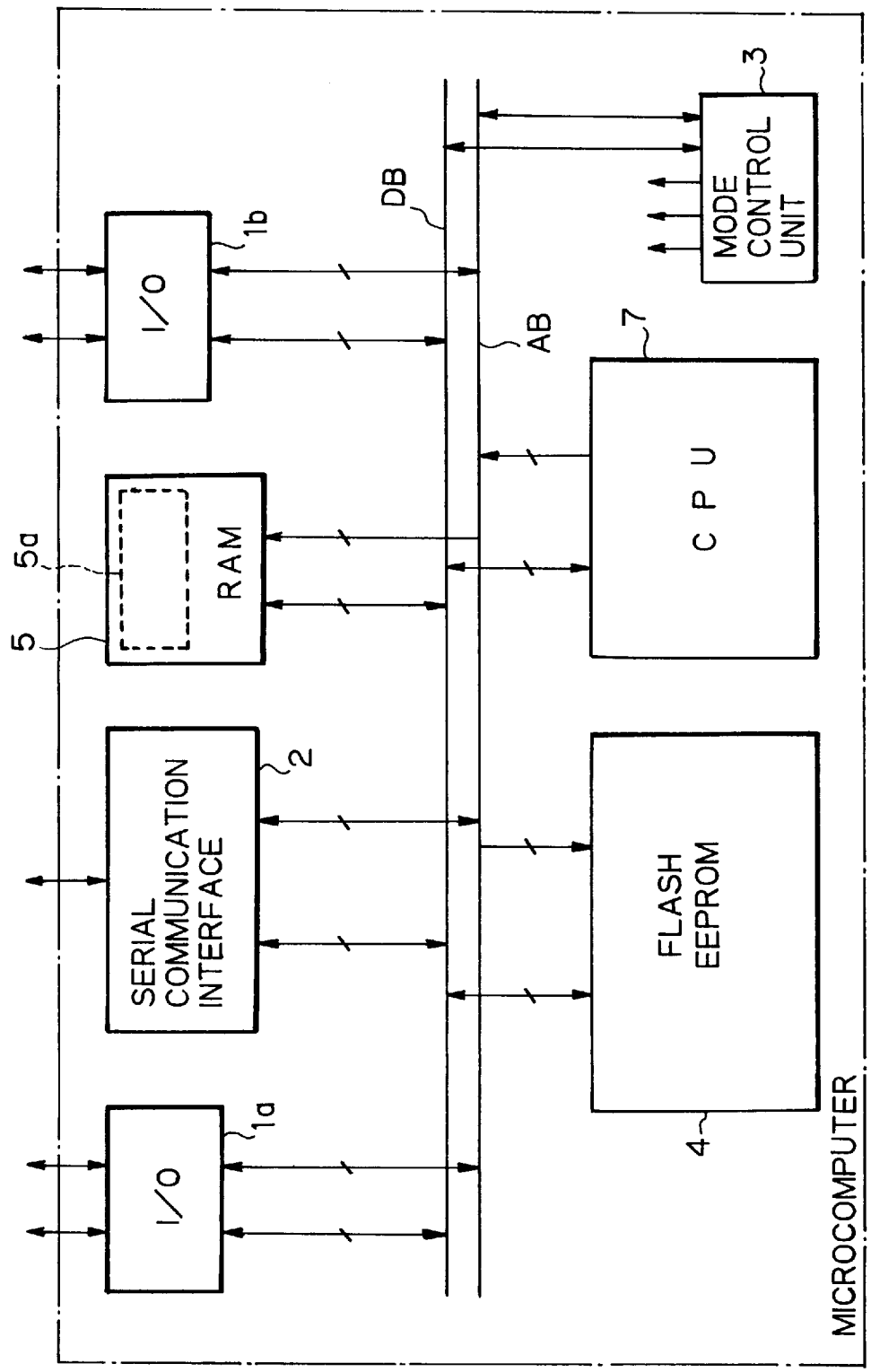
FIG. 7 is a block circuit diagram illustrating a second embodiment of the flash memory incorporating microcomputer according to the present invention.

In FIG. 7, which illustrates a second embodiment of the microcomputer according to the present invention, a writing program area 5a is provided in the RAM 5, and intead of this, the ROM 6 of FIG. 1 is removed. That is, at an initial state such as a power on state, the writing program area 5a is initialized to store a writing program in the writing program area 5a of the RAM 5. For example, the RAM 5 is formed by a static random access memory (SRAM) having flip-flop type cells, and the states of the flip-flop type cells of the writing program area 5a are fixed in advance. That is, since each cell is formed by two resistances and two cross-coupled driving transistors, if one of the resistances is made larger than the other, the state of this cell is fixed.

Figure 8:
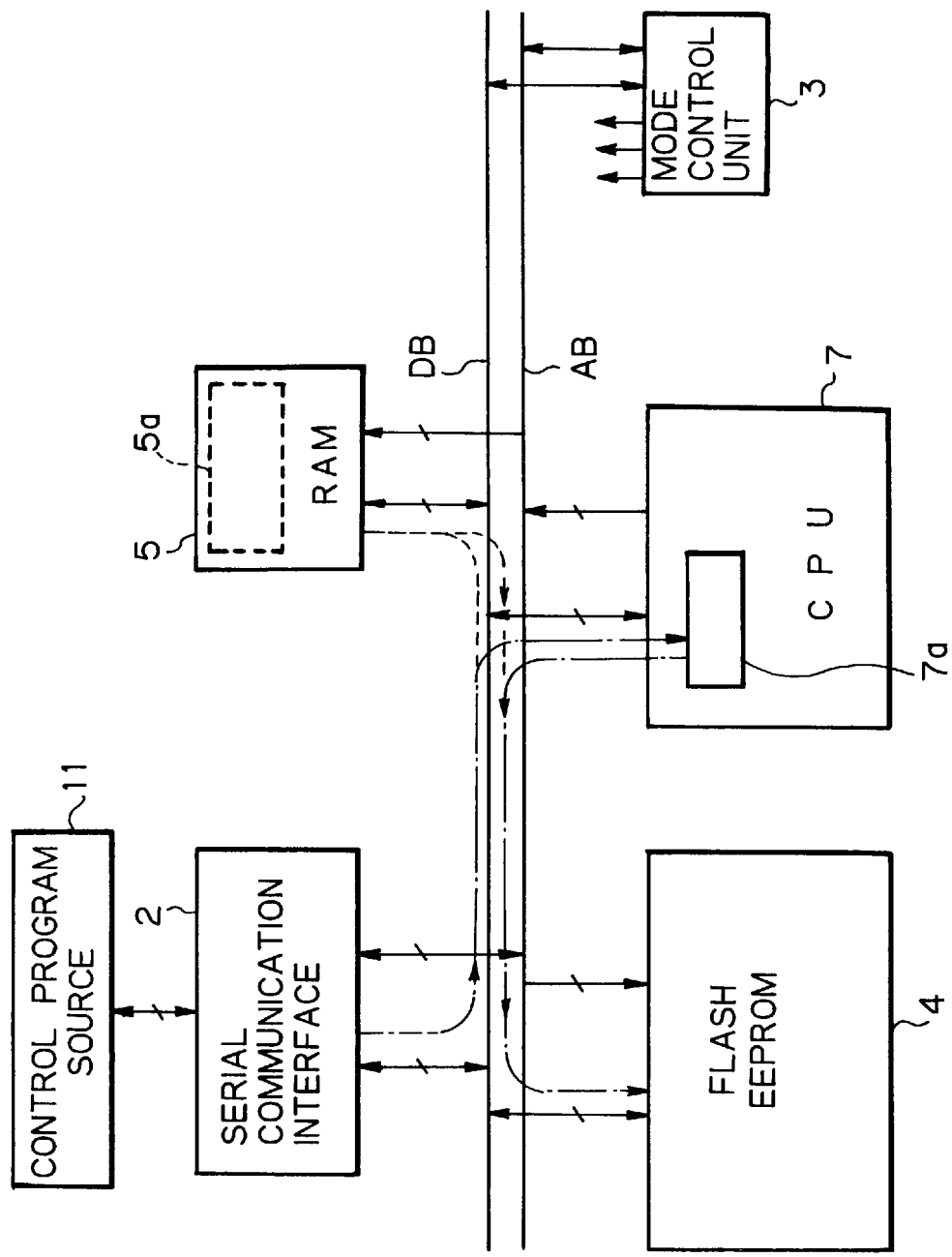
FIG. 8 is a block circuit diagram for showing the operation of the microcomputer of FIG. 7.

Thus, as illustrated in FIG. 8, in an on-board writing operation mode, the CPU 7 reads a control program via the serial communication interface 2 from the control program source 11 in accordance with the writing program stored in the writing program area 5a of the RAM 5, and temprorarily stores the control program into the RAM 5. Then, the control program is written into the flash EEPROM 4 at a predetermined timing. Note that the control program can be temporarily stored in the buffer 7a of the CPU 7 instead of the RAM 5.

Thus, in FIG. 8, since the ROM 6 of FIG. 1 is unnecessary, the chip area of the microcomputer can be reduced, thus increasing the manufacturing yield.

Figure 9:
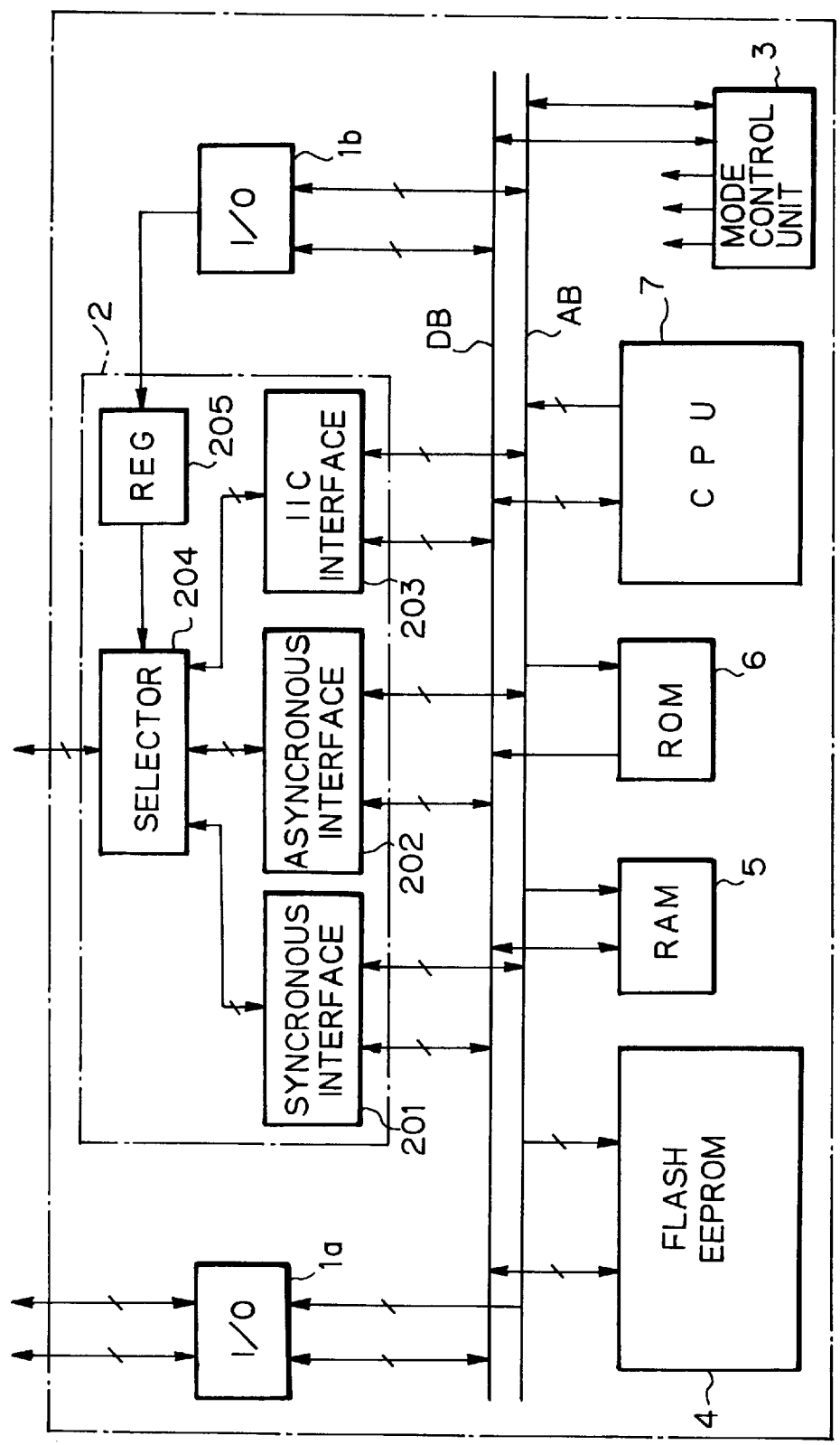
FIG. 9 is a block circuit diagram illustrating a third embodiment of the flash memory incorporating microcomputer according to the present invention.

In FIG. 9, which illustrates a third embodiment of the microcomputer according to the present invention, the serial communication interface 2 of FIG. 1 is modified into a serial communication interface 2'. The serial communication interface 2' includes three types of interfaces, i.e., a synchronous three-wire communication interface 201, an asynchronous two-wire communication interface 202, and a synchronous IIC bus communication interface 203. Also, one of the interfaces 201, 202 and 203 is selected by a selector 204 which is controlled by a register 205. The content of the register 205 is set at a predetermined timing using the flash EEPROM 4 or the RAM 5 which is also set by a power on routine or the like.

Note that the register 205 can be set directly by supplying voltages to terminals of the register 205.

Thus, in FIG. 9, since one of the interfaces 201, 202 and 203 can be selected in accordance with the upper system, thus matching with the upper system.

Figure 10:
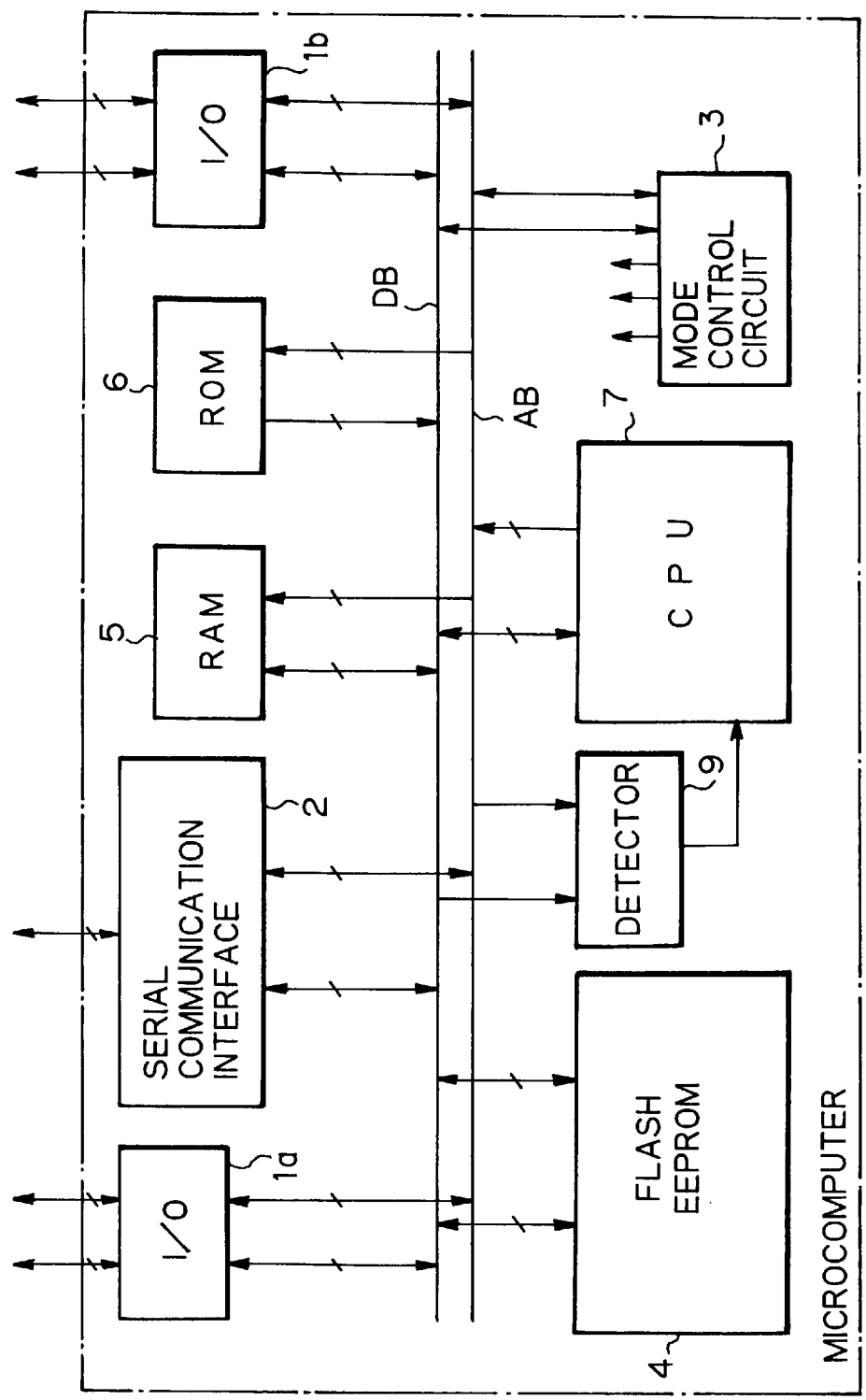
FIG. 10 is a block circuit diagram illustrating a fourth embodiment of the flash memory incorporating microcomputer according to the present invention.

In FIG. 10, which illustrates a fourth embodiment of the microcomputer according to the present invention, a data reception time detector 9 is connected to the internal buses AB and DB, and the data reception time detector 9 is also connected to the CPU 7. That is, in an on-board writing operation mode, the data reception time detector 9 detects an interval time T between one piece of the control program and another piece of the control program, and transmits the interval time T to the CPU 7.

Therefore, in an on-board writing operation mode, the CPU 7 reads a control program via the serial communication interface 2 from the control program source 11 (see FIG. 2B) in accordance with the writing program stored in the ROM 6. In this case, at each timing of reading one piece of the control program, the CPU 7 determines whether or not the interval time T is smaller than a definite time T0. As a result, if T<T0, which means that the data read speed is large, the CPU 7 temporarily stores the piece of the control program into the RAM 5. Then, the control program is written into the flash EEPROM 4 at a predetermined Liming. Note that the control program can be temporarily stored in the buffer 7a (see FIG. 2B) of the CPU 7 instead of the RAM 5. Contrary to this, if T≧T0, which means that the data read speed is small, the CPU 7 directly writes the piece of the control program into the flash EEPROM 4. Thus, the operation speed of the on-board writing operation can be increased.

Figure 11A:
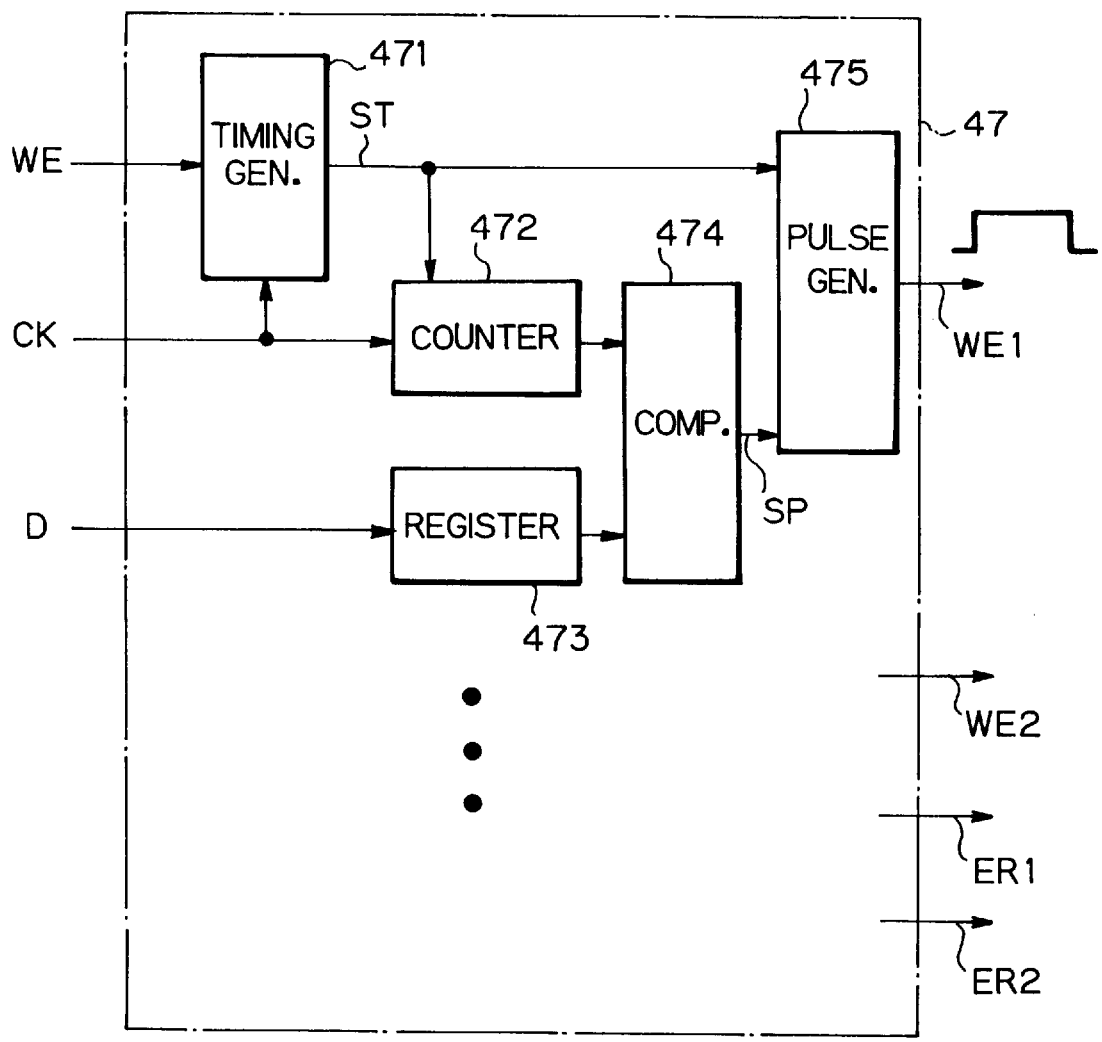
FIG. 11A is a circuit diagram illustrating a fifth embodiment of the flash memory incorporating microcomputer according to the present invention.

In FIG. 11A, which illustrates a fifth embodiment of the microcomputer according to the present invention, the content of the register 473 of FIG. 4 can be changed, while the content of the register 473 in the prior art is fixed. That is, the content of the register 473 can be changed in accordance with the frequency of the clock signal CK.

Figure 11B:
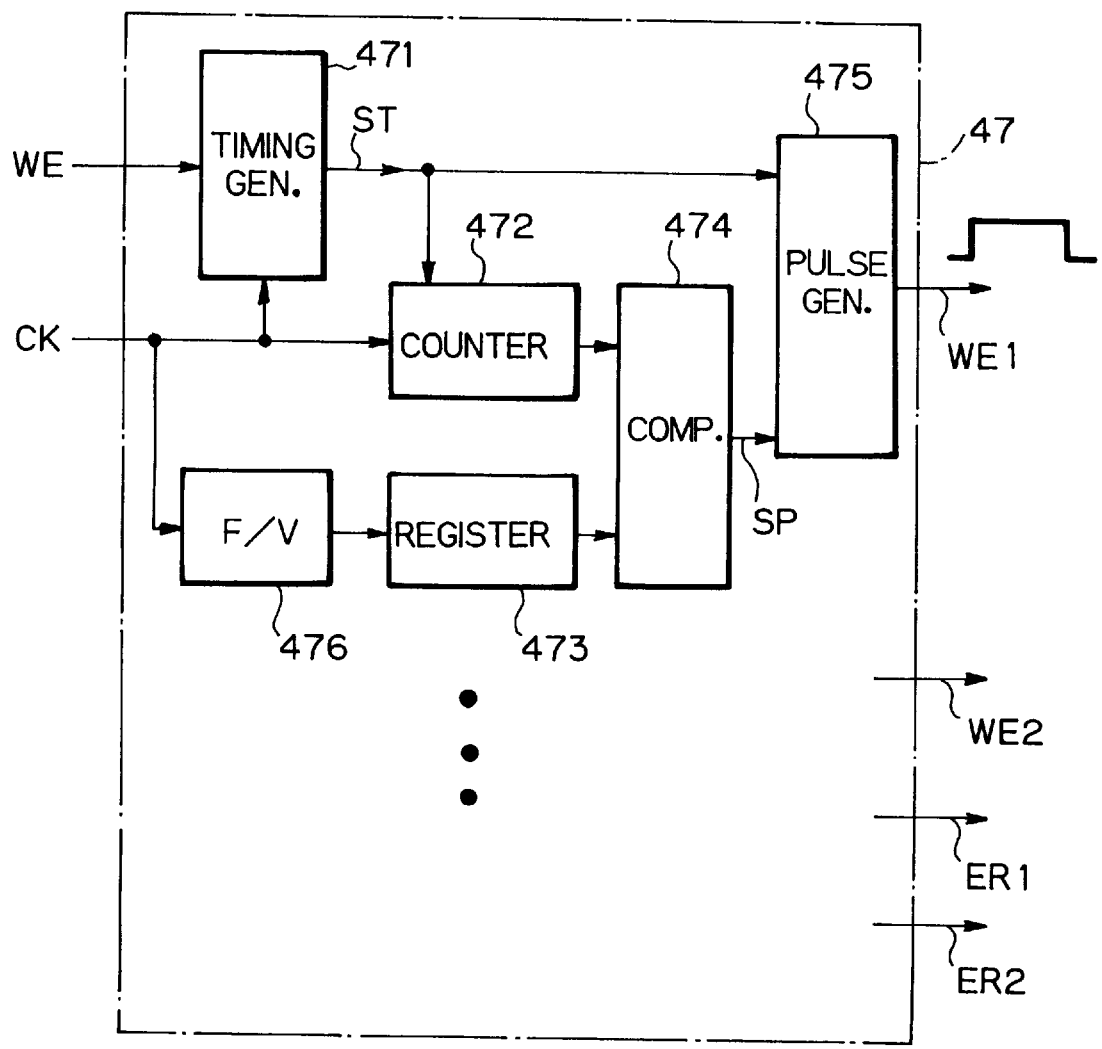
FIGS. 11B, 11C and 11D are circuit diagrams of modifications of the circuit of FIG. 11A.

In FIG. 11B, which is a modification of the control circuit 47 of FIG. 11A, a frequency-to-voltage conversion circuit 476 is connected to the register 473. In this case, the frequency-to-voltage conversion circuit 476 generates a digital signal whose value is proportional to the frequency of the clock signal CK. Therefore, in the control circuit 47 of FIG. 11B, the content of the register 473 can be automatically set.

In FIG. 11B, when the frequency of the clock signal CLK is too large, the value of the frequency to voltage conversion circuit 476 may be larger than the maximum value of the register 473. This is compensated for by circuits as illustrated in FIGS. 11C and 11D.

Figure 11C:
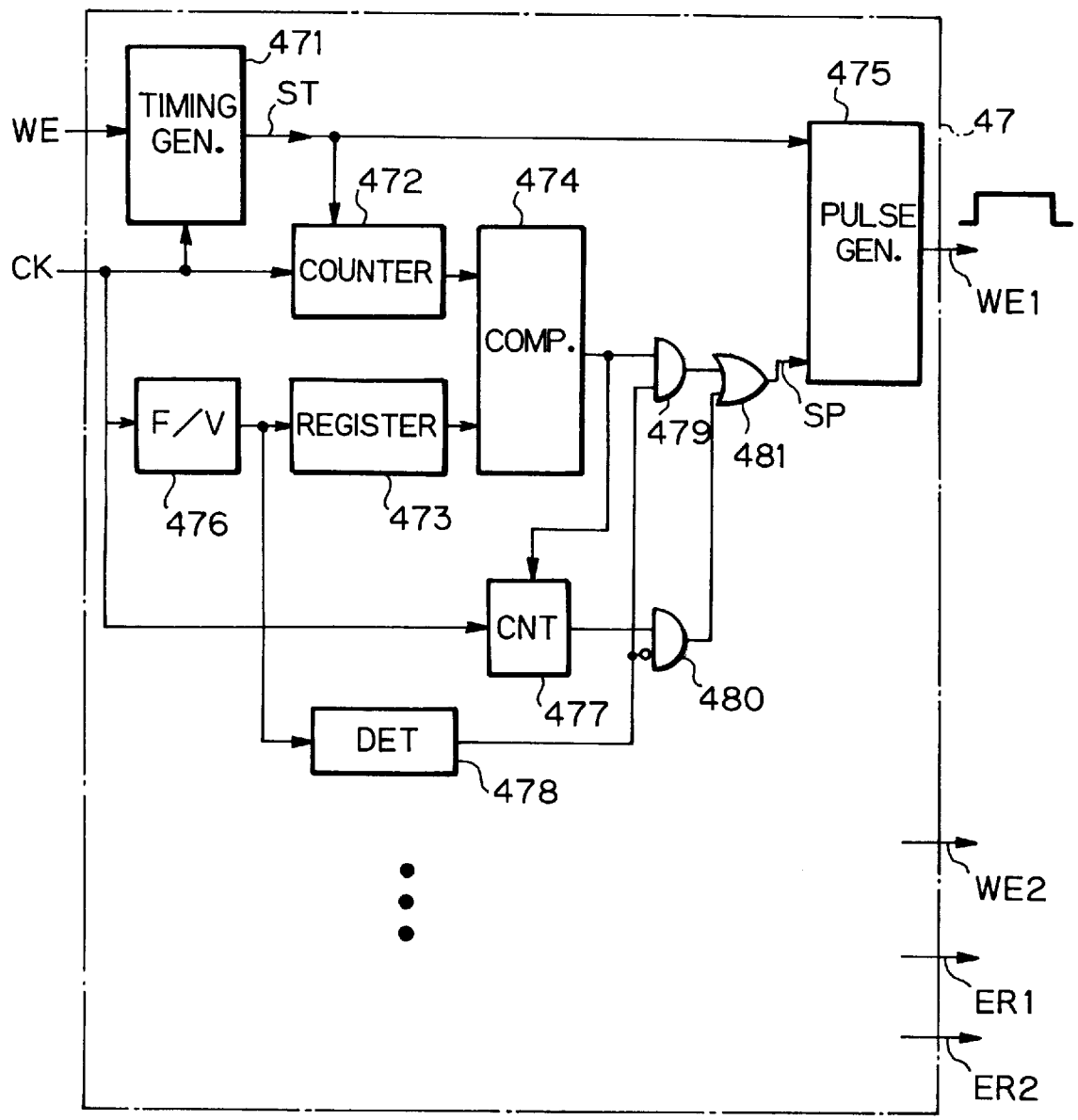

In FIG. 11C, a counter 477, a determination circuit 478, and gate circuits 479, 480 and 481 are added to the elements of FIG. 11B. That is, the counter 477 receives the output of the comparator 474 to count the clock signal CK. Then, when the content of the counter 477 reaches a predetermined value, the counter 477 generates a delayed stop pulse. The determination circuit 478 determines whether or not the value of the frequency-to-voltage conversion circuit 476 is larger than a predetermined value corresponding to the maximum value of the register 473. As a result, if the value of the frequency-to-voltage conversion circuit 476 is larger than the predetermined value, the delay stop signal of the counter 477 is transmitted via the gate circuits 480 and 481 selected by the determination circuit 478 to the pulse generating circuit 475. In this case, the maximum value is set in the register 473. Otherwise, the output signal of the comparator 474 is transmitted via the gate circuits 479 and 481 selected by the determination circuit 478 as the stop pulse to the pulse generating circuit 475.

Figure 11D:
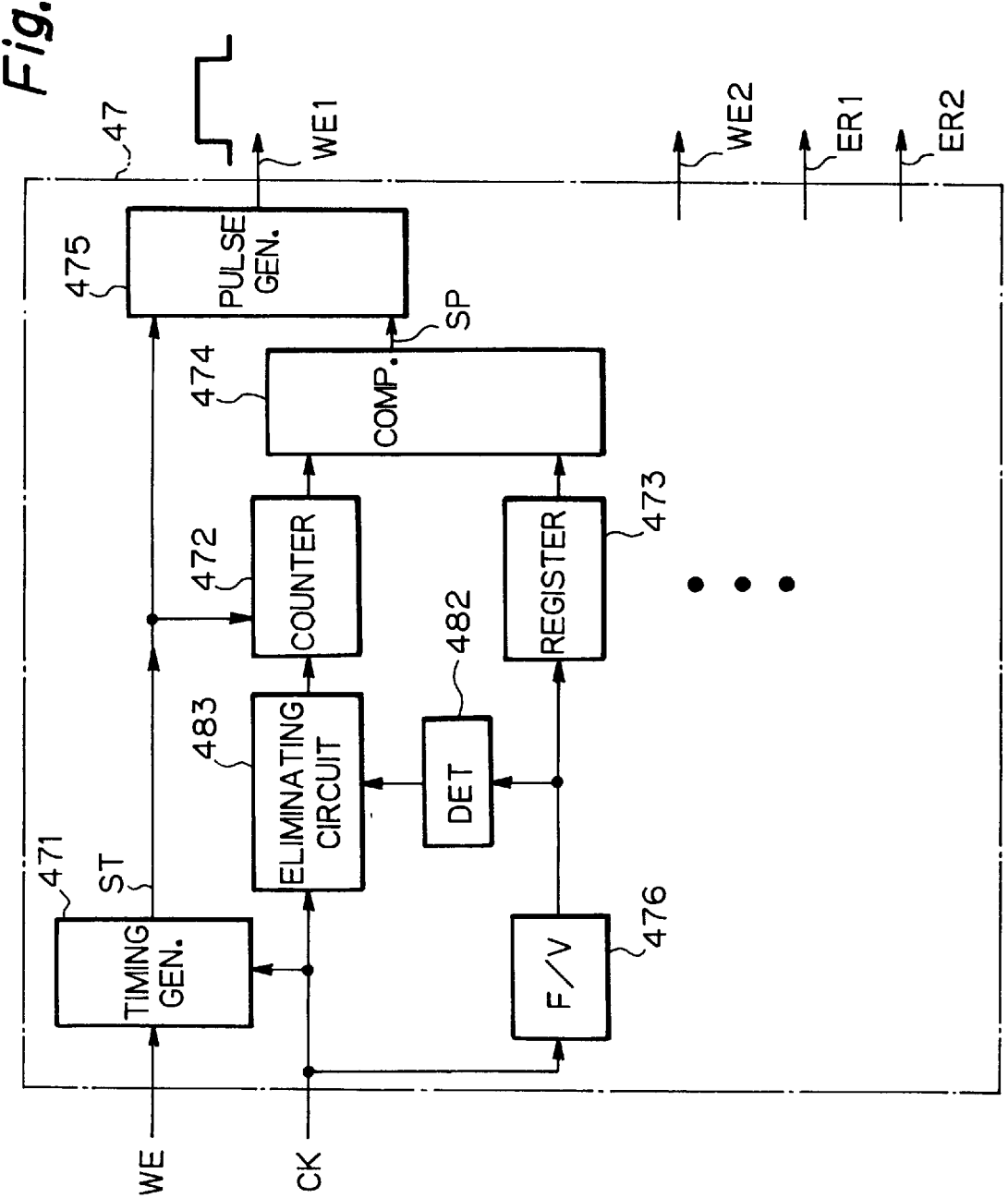

In FIG. 11D, a determination 482, which is the same as the determination circuit 478 of FIG. 11C, and a pulse eliminating circuit 483 are added to the elements of FIG. 11B. The pulse eliminating circuit 483 eliminates a part of pulses of the clock signal CK. As a result, if the value of the frequency-to-voltage conversion circuit 476 is larger than the predetermined value, the pulse eliminating circuit 483 is activated by the determination circuit 482, thus substantially delaying the generation of the stop pulse SP. In this case, the maximum value is also set in the register 473. Otherwise, the pulse eliminating circuit 483 is deactivated by the determination circuit 482, so that all pulses of the clock signal CK pass though the pulse eliminating circuit 483 and reach the counter 472.

As explained hereinabove, according to the presnet invention, since the write enable signal, the erase signal and the other timing signals from the CPU to the flash EEPROM are tested, it is possible to guarantee the operation of the flash EEPROM by the CPU.

Also, since the function of the ROM is incorporated into the RAM, the chip area of the microcomputer is decreased, thus increasing the manufacturing yield.

Further, since the serial communication interface responds to a plurality of types of serial communication interfaces, matching with any possible upper systems can be obtained.

Further, since the operation speed of an on-board writing operation mode is adjusted in accordance with the read speed of a program from the serial communication interface, the operation speed of the on-board writing operation mode can be improved.

Still further, even when the frequency of the clock signal is changed by the upper system or the type of the serial communication interface, the time period of a writing operation and the time period of a flash erasing operation can be almost definite.

We claim:

1. A microcomputer comprising:

internal buses;

a serial communication interface connected to said internal buses;

a flash memory connected to said internal buses;

a RAM, connected to said internal buses, for storing temporary data;

a ROM for storing a writing program;

an input/output port;

a CPU;

a switching circuit connected between said ROM and said internal buses and between said input/output port and said internal buses; and a mode control unit, connected to said internal buses, said serial communication interface, said flash memory, said RAM, said ROM, said CPU and said switching circuit, for operating said switching circuit in an emulation test mode so that said ROM is deactivated and said input/output port is activated, said CPU reading a program from said serial communication interface and writing said program into said flash memory in accordance with a writing program from said input/output port.

2. The microcomputer as set forth in claim 1, wherein said CPU performs a writing verification operation, a flash erasing operation and an erasing verification operation upon said flash memory in accordance with a writing verification program, a flash erasing program and an erasing verification program via said input/output port.

3. The microcomputer as set forth in claim 1, wherein said CPU temporarily stores said program in said RAM before writing into said flash memory.

4. The microcomputer as set forth in claim 1, wherein said CPU temporarily stores said program in a buffer of said CPU before writing into said flash memory.

5. A microcomputer as set forth in claim 1, wherein said flash memory comprises a control circuit for generating control signals for a writing operation and a flash erasing operation in response to a write enable signal and an erase signal, one unit of said control circuit for generating one of said control signals comprising:

a timing generating circuit for receiving one of said write enable signal and said erase signal to generate a start pulse in response to a clock signal;

a counter, connected to said timing generating circuit, for receiving said start pulse to count pulses of said clock signal;

a register for storing a value corresponding to one of a writing operation time and a flash erasing operation time, said value being variable;

a comparator, connected to said counter and said register, for comparing a value of said counter with the value of said register to generate a stop pulse when the value of said counter reaches the value of said register; and a pulse generating circuit, connected to said timing generating circuit and said comparator, for generating a corresponding one of said control signals defined by said start pulse and said stop pulse.

6. The microcomputer as set forth in claim 5, wherein the one unit of said control circuit further comprises a frequency detecting circuit, connected to said register, for detecting a frequency of said clock signal, a value corresponding to the frequency of said clock signal being set in said register.

7. The microcomputer as set forth in claim 6, wherein the one unit of said control circuit further comprises:

a determination circuit, connected to said frequency detecting circuit, for determining whether or not the value corresponding to the frequency of said clock signal is larger than a maximum value of said register;

means, connected to said determination circuit and said comparator, for delaying said stop pulse for a certain time period, when the value corresponding to the frequency of said clock signal is larger than the maximum value of said register.

8. The microcomputer as set forth in claim 6, wherein the one unit of said control circuit further comprises:

a determination circuit, connected to said frequency detecting circuit, for determining whether or not the value corresponding to the frequency of said clock signal is larger than a maximum value of said register; and a pulse eliminating circuit, connected to said determination circuit and said counter, for eliminating a part of pulses of said clock signal, when the value corresponding to the frequency of said clock signal is larger than the maximum value of said register.

9. A method for testing a microcomputer including:

internal buses; a serial communication interface connected to said internal buses; a flash memory connected to said internal buses; a RAM, connected to said internal buses, for storing temporary data; a ROM for storing a writing program; an input/output port; a CPU; a switching circuit connected between said ROM and said internal buses and between said input/output port and said internal buses; a mode control unit, connected to said internal buses, said serial communication interface, said flash memory, said RAM, said ROM, said CPU and said switching circuit, for operating said switching circuit in an emulation test mode so that said ROM is deactivated and said input/output port is activated, said method comprising the steps of:

connecting an emulation memory for storing said writing program to said input/output port, said emulation memory having the same address space as said ROM;

connecting an emulation test data source for storing a program to said serial communication interface; and reading said program from said emulation test data source and writing said program into said flash memory in accordance with said writing program stored in said emulation memory by said CPU.

10. The method as set forth in claim 9, further comprising performing a writing verification operation, a flash erasing operation and an erasing verification operation upon said flash memory in accordance with a writing verification program, a flash erasing program and an erasing verification program stored in said emulation memory by said CPU.

11. A microcomputer comprising:

internal buses;

a serial communication interface connected to said internal buses;

a flash memory connected to said internal buses;

a RAM, connected to said internal buses, for storing a writing program;

a CPU; and a mode control unit, connected to said internal buses, said serial communication interface, said flash memory, said RAM, an input/output port and said CPU, for setting an on-board writing mode in said microcomputer, said CPU reading a program from said serial communication interface and writing said program into said flash memory in accordance with a writing program stored in said RAM.

12. The microcomputer as set forth in claim 11, wherein an area of said RAM for storing said writing program comprises flip-flop type cells each having two resistances and two cross-coupled transistors, one of said resistances being different from the other.

13. A microcomputer as set forth in claim 11, wherein said flash memory comprises a control circuit for generating control signals for a writing operation and a flash erasing operation in response to a write enable signal and an erase signal, one unit of said control circuit for generating one of said control signals comprising:

a timing generating circuit for receiving one of said write enable signal and said erase signal to generate a start pulse in response to a clock signal;

a counter, connected to said timing generating circuit, for receiving said start pulse to count pulses of said clock signal;

a register for storing a value corresponding to one of a writing operation time and a flash erasing operation time, said value being variable;

a comparator, connected to said counter and said register, for comparing a value of said counter with the value of said register to generate a stop pulse when the value of said counter reaches the value of said register; and a pulse generating circuit, connected to said timing generating circuit and said comparator, for generating a corresponding one of said control signals defined by said start pulse and said stop pulse.

14. The microcomputer as set forth in claim 13, wherein the one unit of said control circuit further comprises a frequency detecting circuit, connected to said register, for detecting a frequency of said clock signal, a value corresponding to the frequency of said clock signal being set in said register.

15. The microcomputer as set forth in claim 14, wherein the one unit of said control circuit further comprises:

a determination circuit, connected to said frequency detecting circuit, for determining whether or not the value corresponding to the frequency of said clock signal is larger than a maximum value of said register;

means, connected to said determination circuit and said comparator, for delaying said stop pulse for a certain time period, when the value corresponding to the frequency of said clock signal is larger than the maximum value of said register.

16. The microcomputer as set forth in claim 14, wherein the one unit of said control circuit further comprises:

a determination circuit, connected to said frequency detecting circuit, for determining whether or not the value corresponding to the frequency of said clock signal is larger than a maximum value of said register; and a pulse eliminating circuit, connected to said determination circuit and said counter, for eliminating a part of pulses of said clock signal, when the value corresponding to the frequency of said clock signal is larger than the maximum value of said register.

17. A microcomputer comprising:

internal buses;

a serial communication interface connected to said internal buses;

a flash memory connected to said internal buses;

a RAM, connected to said internal buses, for storing temporary data;

a ROM for storing a writing program;

an input/output port;

a CPU; and a mode control unit, connected to said internal buses, said serial communication interface, said flash memory, said RAM, said ROM, said CPU and said switching circuit, for setting operation modes and testing modes in said microcomputer, said serial communication interface including a plurality of kinds of serial communication interface units, and a selector means for selecting one of said serial communication interface units.

18. A microcomputer as set forth in claim 17, wherein said flash memory comprises a control circuit for generating control signals for a writing operation and a flash erasing operation in response to a write enable signal and an erase signal, one unit of said control circuit for generating one of said control signals comprising:

a timing generating circuit for receiving one of said write enable signal and said erase signal to generate a start pulse in response to a clock signal;

a counter, connected to said timing generating circuit, for receiving said start pulse to count pulses of said clock signal;

a register for storing a value corresponding to one of a writing operation time and a flash erasing operation time, said value being variable;

a comparator, connected to said counter and said register, for comparing a value of said counter with the value of said register to generate a stop pulse when the value of said counter reaches the value of said register; and a pulse generating circuit, connected to said timing generating circuit and said comparator, for generating a corresponding one of said control signals defined by said start pulse and said stop pulse.

19. The microcomputer as set forth in claim 18, wherein the one unit of said control circuit further comprises a frequency detecting circuit, connected to said register, for detecting a frequency of said clock signal, a value corresponding to the frequency of said clock signal being set in said register.

20. The microcomputer as set forth in claim 19, wherein the one unit of said control circuit further comprises:

a determination circuit, connected to said frequency detecting circuit, for determining whether or not the value corresponding to the frequency of said clock signal is larger than a maximum value of said register;

means, connected to said determination circuit and said comparator, for delaying said stop pulse for a certain time period, when the value corresponding to the frequency of said clock signal is larger than the maximum value of said register.

21. The microcomputer as set forth in claim 19, wherein the one unit of said control circuit further comprises:

a determination circuit, connected to said frequency detecting circuit, for determining whether or not the value corresponding to the frequency of said clock signal is larger than a maximum value of said register; and a pulse eliminating circuit, connected to said determination circuit and said counter, for eliminating a part of pulses of said clock signal, when the value corresponding to the frequency of said clock signal is larger than the maximum value of said register.

22. A microcomputer comprising:

internal buses;

a serial communication interface connected to said internal buses;

a flash memory connected to said internal buses;

a RAM, connected to said internal buses, for storing temporary data;

a ROM for storing a writing program;

an input/output port;

a CPU;

a mode control unit, connected to said internal buses, said serial communication interface, said flash memory, said RAM, said ROM, said CPU and said switching circuit, for setting an on-board writing operation in said microcomputer, and a data reception time detector, connected to said internal buses and said CPU, for counting an interval time between pieces of said program propagating said internal buses, said CPU temporarily storing said program in one of said RAM and a buffer of said CPU before writing said flash memory, when said interval time is smaller than a certain value, said CPU directly writing said program into said flash memory, when said interval time is not smaller than said certain value.

23. A microcomputer as set forth in claim 22, wherein said flash memory comprises a control circuit for generating control signals for a writing operation and a flash erasing operation in response to a write enable signal and an erase signal, one unit of said control circuit for generating one of said control signals comprising:

a timing generating circuit for receiving one of said write enable signal and said erase signal to generate a start pulse in response to a clock signal;

a counter, connected to said timing generating circuit, for receiving said start pulse to count pulses of said clock signal;

a register for storing a value corresponding to one of a writing operation time and a flash erasing operation time, said value being variable;

a comparator, connected to said counter and said register, for comparing a value of said counter with the value of said register to generate a stop pulse when the value of said counter reaches the value of said register; and a pulse generating circuit, connected to said timing generating circuit and said comparator, for generating a corresponding one of said control signals defined by said start pulse and said stop pulse.

24. The microcomputer as set forth in claim 23, wherein the one unit of said control circuit further comprises a frequency detecting circuit, connected to said register, for detecting a frequency of said clock signal, a value corresponding to the frequency of said clock signal being set in said register.

25. The microcomputer as set forth in claim 24, wherein the one unit of said control circuit further comprises:

a determination circuit, connected to said frequency detecting circuit, for determining whether or not the value corresponding to the frequency of said clock signal is larger than a maximum value of said register;

means, connected to said determination circuit and said comparator, for delaying said stop pulse for a certain time period, when the value corresponding to the frequency of said clock signal is larger than the maximum value of said register.

26. The microcomputer as set forth in claim 24, wherein the one unit of said control circuit further comprises:

a determination circuit, connected to said frequency detecting circuit, for determining whether or not the value corresponding to the frequency of said clock signal is larger than a maximum value of said register; and a pulse eliminating circuit, connected to said determination circuit and said counter, for eliminating a part of pulses of said clock signal, when the value corresponding to the frequency of said clock signal is larger than the maximum value of said register.

* * * * *